Feb. 7, 1967    A. C. HOWELL, JR    3,303,293
CONDUCTOR BAR
Filed Aug. 25, 1964
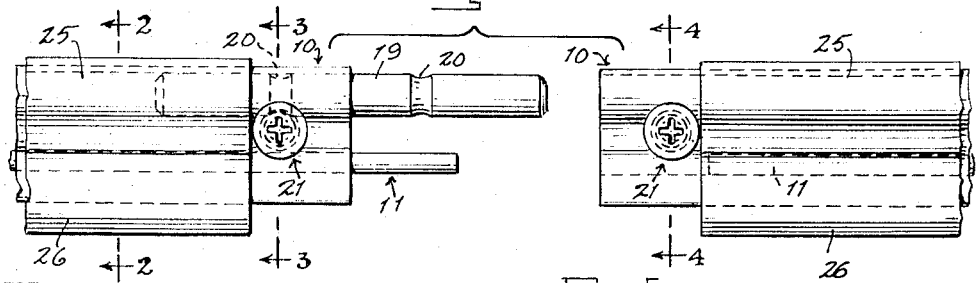
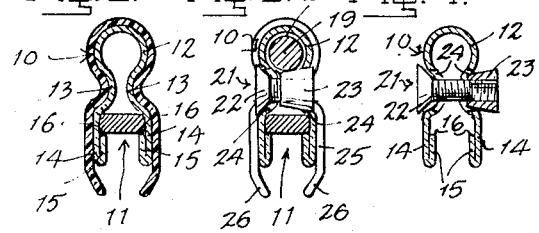 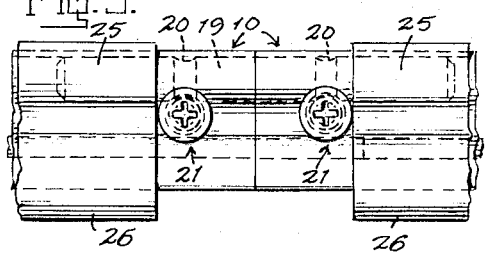
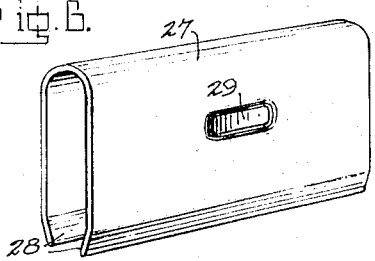 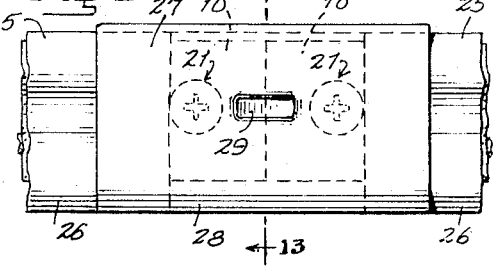
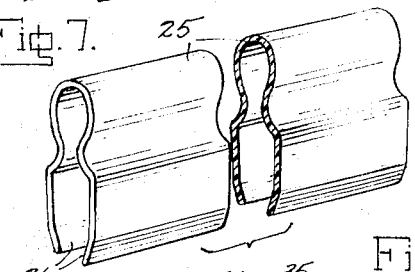 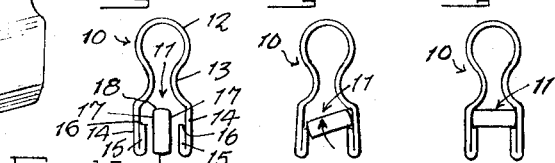
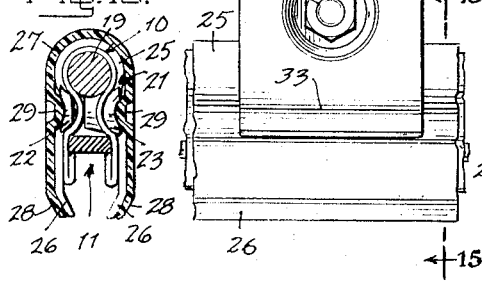 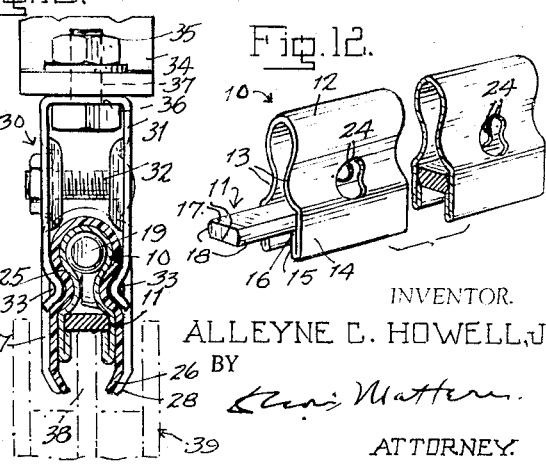
INVENTOR.
ALLEYNE C. HOWELL, JR.
BY
ATTORNEY.

United States Patent Office 3,303,293
Patented Feb. 7, 1967

3,303,293
CONDUCTOR BAR
Alleyne C. Howell, Jr., 645 Mine Hill Road,
Fairfield, Conn. 06430
Filed Aug. 25, 1964, Ser. No. 391,968
16 Claims. (Cl. 191—23)

The present invention relates to a conductor bar for electrical trolley busway systems such as monorails, cranes, hoists and the like wherein a stationary conductor bar is engaged by the brush or shoe of a current-collecting head carried by a motor-driven mobile unit. An object of the invention is to provide a conductor bar of simple and inexpensive construction having a high degree of mechanical strength combined with high electrical conductivity, and in this respect the present invention embodies the general principles of construction and operation employed in the conductor bar disclosed and claimed in my United States Patent No. 3,144,508 granted August 11, 1964, with additional advantages in the assembly, maintenance and efficiency of the conductor bar.

The conductor bar as disclosed in my said patent comprises an elongated current-conducting sheet metal shell and a separate current-conducting contact bar or strip secured within said shell in current-conducting relationship therewith, whereby the current-conducting capacity of the conductor bar is the sum of the current-conducting capacities of said shell and conductor strip, and it is an object of the present invention to provide a shell having inherent resilience and a contact bar or strip which may be assembled in interlocking relation with the shell through snap engagement, the inherent resilience of the shell permitting it to be sprung over the contact bar and serving to retain it in interlocking relation under resilient pressure to insure firm electrical contact between the surfaces of the shell and the contact bar.

In the conductor bar as disclosed in my said patent the shell includes an insulated layer or coating laminated thereto, and it is an object of the present invention to provide a separable insulating sheath formed of a semi-rigid resilient insulating material adapted to be sprung over the shell and to tightly conform to its external surface in substantially skin-tight relation to the end of obtaining maximum dielectric efficiency.

In practice, the conductor bar of the invention is adapted to be produced in relatively short lengths as compared to the length of a complete industrial installation, for example in 10-foot lengths, such relatively short lengths having advantages in packing, storing and shipping as well as in installation of the conductor bar sections, and it is an object of the invention to provide an improved joint means for connecting the butted ends of the conductor bar sections which, while permitting the easy engagement of the joint means through longitudinal sliding action, will provide a positive interlock that effectually prevents the joint from pulling apart through longitudinal pull thereon.

A further object is to provide an improved insulating cover for the joint between conductor bar sections which, in cooperation with the insulating sheaths of the respective conductor bar sections, provides continuous insulation along the trolley busway system.

A further object is to provide an improved cooperative relationship between the hanger clamp means for supporting the conductor bar and the structural shape of the latter, whereby positive and direct support of the conductor bar shell is obtained, with the insulation sheath interposed between the hanger clamp means and the shell.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of the mating end portions of a pair of two conductor bar sections in a separated relation;

FIG. 2 is a transverse vertical sectional view taken along the line 2—2 of FIG. 1;

FIG. 3 is a transverse vertical sectional view taken along the line 3—3 of FIG. 1;

FIG. 4 is a transverse vertical sectional view taken along the line 4—4 of FIG. 1;

FIG. 5 is a side elevation showing the mating ends as seen in FIG. 1 in inter-engaged relation;

FIG. 6 is a perspective view of the joint cover member;

FIG. 7 is a perspective view of the insulating sheath member, with the intermediate portion thereof broken away;

FIG. 8 is a side elevation of the connected end portions as seen in FIG. 5, with the joint cover member in place;

FIG. 9 is an end elevation showing the conductor bar shell with the contact bar inserted in loose relation therein preparatory to assembly therewith;

FIG. 10 is a similar view showing the contact bar in a transitory position as it is snapped into place;

FIG. 11 is a similar view showing the contact bar in assembled relation in the shell;

FIG. 12 is a perspective view of the assembled shell and contact bar, with the intermediate portion thereof broken away;

FIG. 13 is a transverse vertical sectional view taken along the line 13—13 of FIG. 8;

FIG. 14 is a fragmentary side elevation showing a conductor bar section in suspended relation to a hanger clamp; and FIG. 15 is a transverse vertical sectional view taken along the line 15—15 of FIG. 14, the broken lines showing the relative position of engagement of a collector shoe with the conductor bar.

Referring to the drawing the conductor bar, according to the exemplary embodiment of the invention illustrated therein, comprises a series of conductor bar sections joined together in end-to-end relation, each said section comprising an elongated shell 10, preferably formed from current-conducting sheet metal, of sufficient rigidity to provide the necessary strength for a suspended trackway, and having sufficient inherent resiliency for snap assembly with the contact bar 11, as will presently more fully appear. In practice, the conductor bar of the invention may be of any suitable size, but in a typical installation it is approximately one inch in its vertical dimension and is provided in 10-foot sections supported at 5-foot intervals by suspension hanger clamps, the latter being preferably evenly spaced so that each section is supported by two hanger clamps spaced five feet apart and two-and-a-half feet from each end.

The shell 10 is of generally inverted U-shape in cross-section and comprises an upper end portion 12, which is generally cylindrical to receive a cylindrical joint pin as will hereinafter more fully appear, and laterally spaced side walls, each including a longitudinal concave indentation 13, concavely curved at its outer side and convexly curved at its inner side, merging with the upper end portion 12, a lower vertical side wall portion 14 extending downwardly from the indented portion 13, and a flange portion 15 bent upwardly from the lower edge of the portion 14 against its inner side, its edge 16 terminating in downwardly spaced relation to the inner convex surface of the indentation 13 and providing an upwardly facing longitudinal shoulder in spaced and opposed relation to the downwardly facing shoulder provided by the inner convex side of the indentation 13. The spacing between the opposed shoulders substantially corresponds to the thickness of the contact bar 11 and the normal spacing between the inner sides of the side leg portions 14 substantially corresponds to the width of the contact bar 11.

The contact bar 11 is preferably of substantially greater thickness than the thickness of the sheet metal of which the shell 10 is formed and its cross-sectional shape is defined by flat parallel side surfaces 17—17 and convexly curved edge surfaces 18—18. Any desired electrical capacity of the conductor bar may be obtained without changing the dimensions of the shell or contact bar through the selection of suitable conducting material. Thus the contact bar may be of steel, copper, copper-clad steel, stainless steel, galvanized steel, etc., and in the case of metals that are subject to oxidation or galvanic action it may be zincated or otherwise suitably coated. The shell 10 may be formed of steel, aluminum or other suitable metal depending upon the desired properties of strength and electrical conductivity. By virtue of the fact that the shell is a separate piece from the contact bar the construction permits the efficient use of aluminum as the metal of the shell, aluminum being an excellent conductor but a poor metal for sliding contact since it forms an insulating surface of aluminum oxide. Where the diversity of the metals employed will result in galvanic action a suitable coating may be provided to prevent this. For example, an aluminum shell may be zincated to avoid galvanic action with a contact bar of galvanized or zinc-coated steel, or of copper.

As shown in FIGS. 9–11 the contact bar 11 is conveniently assembled with the shell 10 by inserting it in edgewise position upwardly in the open side of the shell and thereupon turning it as seen in FIG. 10 with one convex edge resting in the recess above the edge shoulder 16 of one leg of the shell while the other convex edge is forced upwardly along the flange 15 of the opposite leg thus causing the legs to spring apart and permit the bar to move into horizontal position above the shoulder 16 of said opposite leg. Thereupon the sprung-apart legs close into tight engagement with the edge surfaces of the bar, as seen in FIG. 11, to thus retain the bar in firmly interlocked relation between the edge shoulders 16 and the opposed shoulders of the indentations 13. In such relation the side walls 14, the flanges 15, and the contact bar form an inverted metal channel with the flat downwardly facing surface 17 of the contact bar providing a flat contact surface to engage and track the collector shoe of the trolley busway system, as will hereinafter more fully appear.

The length of the contact bar corresponds to the length of the shell but is assembled therewith in longitudinally offset relation so that one end of the bar projects a short distance from the shell and the other end of the bar is recessed an equal distance into the shell. In addition to facilitating the joining of the butted ends of the end-to-end conductor bar sections this arrangement also aids in the assembly or disassembly of the contact bar by providing an exposed projecting end for engagement by a plier or other suitable tool to apply turning movement to the bar. The arrangement also makes for the convenient replacement of the contact bars when they become worn to the point where a new contact bar is required.

In one end of each conductor bar section there is engaged and secured a cylindrical joint pin 19 slideably fitted within the upper end portion 12 of the shell with one-half of the pin engaged within the shell and the other half projecting for the purpose of slideable engagement with the next adjacent conductor bar section, as seen in FIG. 1. A pair of annular concave grooves 20—20 are provided in the pin in equally spaced relation from each end and which are respectively engaged by taper-lock units 21 carried in the respective ends of each conductor bar section. Each taper-lock unit comprises a bevel-headed screw 22 engaged with an internally threaded tapered sleeve 23 and is assembled with the shell by providing circular holes 24 adjacent the ends of the shell positioned in the indentations 13 of the opposed side legs, the beveled head of the screw 22 bearing in one hole and the tapered sleeve 23 bearing in the opposite hole with the transverse axis of the holes being so related to the longitudinal axis of the pin 19 that as the taper-lock unit is tightened from its open position as seen in FIG. 4 to its closed position as seen in FIG. 3 the tapered sleeve 23 is drawn into wedging engagement in the annular groove 20 of the pin and thus locks it against longitudinal movement. At the same time the tightening of the taper-lock unit draws the side legs of the shell tightly against the contact bar and thus prevents any possibility of outward flexing of the side legs of the shell when the taper-lock unit is in fully tightened position.

As seen in FIG. 1 the adjacent ends of two conductor bar sections are joined by inserting the projecting end of the pin 19 and the projecting end of the contact bar 11 of one section in the opposed open end of the other section with the taper-lock unit of said other section loosened for this purpose. When the sections are brought into abutted relation as seen in FIG. 5 the taper-lock unit of the joined section is tightened to thus positively interlock the two sections against longitudinal movement. At the same time the projected end of the contact bar of the one section is brought into contacting relation with the recessed end of the contact bar of the other section.

An insulating sheath 25, preferably an extrusion of dielectric plastic material, for example polyvinyl chloride, has a cross-sectional shape generally conforming to the cross-sectional shape of the shell with its interior contour substantially corresponding to the exterior contour of the shell so that it may be engaged upon the shell with a substantial skin-tight fit. The side walls of the sheath extend downwardly below the lower edges of the shell and terminate in inwardly inclined flange portions 26 which provide a restricted entrance to the inverted contact channel of the shell, at the same time isolating the metallic shell and contact bar against accidental contact by a person's fingers. In the pre-assembled condition of the sheath as seen in FIG. 7 its side walls preferably converge slightly so that as the sheath is sprung over the shell the side walls spring outwardly to the point where indentations of the sheath snap into the indentations 13 of the shell. Thereupon the inherent resilience of the sheath causes its side walls to press into skin-tight engagement with the side walls of the shell. The length of the sheath is sufficiently shorter than the shell for its ends to clear the taper-lock units 21.

A joint cover 27, preferably formed of the same dielectric plastic material as the insulating sheath 25, is sprung over the exposed ends of the joined conductor bar sections, as seen in FIGS. 8 and 13. The joint cover is of inverted U-shape in cross-section having a length substantially greater than the exposed joint and an interior dimension designed to fit snugly over the end portions of the sheaths where it is retained against upward displacement by inwardly inclined lower marginal edge flanges 28—28 which fit against the outer sides of the inclined lower edge portions 26 of the sheaths. In order to prevent longitudinal displacement of the joint cover its opposed walls are provided at their inner surfaces with projecting bosses 29—29, preferably formed by indenting from the outer side, which are positioned between the projected ends of the pair of taper-lock units which act as limit stops against longitudinal movement of the joint cover.

The suspension hanger clamp 30 as seen in FIGS. 14 and 15 comprises an inverted U-shaped clamp member 31, having a tightening bolt 32 extending between its side walls, and provided at the lower ends of the side walls with inwardly directed clamping jaws 33 of substantially V-shape in cross-section which engage within the indentations 13 of the shell with the insulating sheath interposed. The hanger clamp is supported upon an angle support 34 to which it is suitably connected by means of a bolt 35 engaged through apertures 36 and 37 respectively in the upper end of the clamp and in the angle support. The angle support, as will be understood, is suitably supported upon a ceiling or other suitable structure.

In operation the contact shoe 38 of the collector head 39 engages within the inverted channel of the conductor bar in sliding contact with the flat under surface of the contact bar 11 as shown by the broken lines in FIG. 15.

What is claimed is:

1. A conductor bar comprising a shell of substantially inverted U-shape in cross-section including an upper end portion and side walls extending downwardly from said upper end portion with their lower edges transversely aligned, said shell having inherent resiliency whereby said side walls may be sprung outwardly from a normal position, said side walls having transversely opposed longitudinally extending recess formations at their inner sides in upwardly spaced parallel relation to their lower edges, and a current-conducting contact bar within said shell in spanning relation between said side walls having longitudinal side edges disposed and retained within said recess formations in said normal position of said side walls and being separable therefrom through outward springing of said side walls.

2. The invention as defined in claim 1, further characterized in that said contact bar has relatively wide flat parallel side surfaces and relatively narrow convexly curved edge surfaces.

3. A conductor bar comprising a current-conducting sheet metal shell of generally inverted U-shape in cross-section including an upper end portion and side walls extending downwardly from said upper end portion with their lower edges transversely aligned, said shell having inherent resiliency whereby said side walls may be sprung outwardly from a normal position, said side walls having transversely aligned longitudinal indentations at their outer sides forming transversely aligned downwardly facing shoulders at the inner sides of said side walls, and lower wall portions extending downwardly from said indentations having lower marginal portions extending upwardly within said shell with their terminal edges constituting upwardly facing transversely aligned shoulders upwardly spaced from said lower edges of said side walls and downwardly spaced from said downwardly facing shoulders and defining therewith transversely opposed longitudinally extending recess formations, and a current-conducting contact bar within said shell in spanning relation between said side walls having longitudinal side edges disposed and retained within said recess formations in said normal position of said side walls and being separable therefrom through outward springing of said side walls.

4. The invention as defined in claim 3, further characterized in that said upper end portion of said shell is substantially cylindrical and defines a substantially cylindrical passage, and said indentations are concavely curved and constitute a reverse curve continuation of the curvature of said upper end portion.

5. The invention as defined in claim 3, further characterized in that said lower wall portions of said side walls are substantially vertical and parallel to each other, and said lower marginal portions are parallel to and in contact with the inner surfaces of said lower wall portions and are connected thereto by bends constituting the lower edges of said shell.

6. The invention as defined in claim 3, further characterized in that said upper end portion of said shell is substantially cylindrical and defines a substantially cylindrical passage, and said indentations are concavely curved and constitute a reverse curve continuation of the curvature of said upper end portion, said lower wall portions of said side walls are vertical and parallel to each other, and said lower marginal portions are parallel to and in contact with the inner surfaces of said lower wall portions and are connected thereto by bends constituting the lower edges of said shell.

7. The invention as defined in claim 3, further characterized by an insulation sheath of dielectric plastic material engaged over said shell, said sheath being of substantially inverted U-shape in cross-section and including an upper end portion and side walls extending downwardly from said upper end portion of substantially uniform thickness and of a cross-sectional shape to conform in substantially skin-tight relation to the outer surfaces of said shell, said side walls of said sheath extending downwardly below said lower edges of said shell and having lower marginal portions inclined inwardly in spaced relation below said lower edges of said shell.

8. The invention as defined in claim 7, further characterized by a hanger clamp of substantially inverted U-shape in cross-section having inwardly directed jaws for respective engagement within said indentations of said shell with the side walls of said sheath interposed.

9. A conductor bar for connection in end-to-end relation to identical conductor bars, comprising a shell of substantially inverted U-shape in cross-section including an upper end portion defining a longitudinal passage and side walls extending downwardly from said upper end portion with their lower edges transversely aligned, a current-conducting contact bar within said shell in spanning relation between said side walls, a joint pin engaged in one end of said passage and projected therefrom for insertion in the end of the passage of an identical conductor bar, said pin having first and second spaced grooves, said first groove disposed within said passage and said second groove disposed without said passage for disposition within the passage of said identical conductor bar, and locking means extending between said side walls adjacent each end of said bar, one said locking means engageable in said first groove of said pin, and the other said locking means adapted to engage the second groove of the pin of an identical conductor bar upon insertion in said passage.

10. The invention as defined in claim 9, further characterized in that one end of said contact bar is projected from one end of said shell and the other end is recessed within the other end of said shell a distance equal to the projected length of said one end of said contact bar.

11. The invention as defined in claim 9, further characterized in that said locking means each comprise a headed screw and an externally tapered internally threaded sleeve engaged by said screw, and said side walls of said shell have transversely opposed holes respectively engaged by said screw and sleeve, said sleeve adapted upon tightening of said screw to be drawn into interlocking engagement in a groove of said pin.

12. The invention as defined in claim 11, further characterized in that said shell has inherent resiliency whereby said side wall portions may be sprung outwardly from a normal position, said side walls have transversely opposed longitudinally extending recess formations at their inner sides in upwardly spaced parallel relation to their lower edges, and said contact bar has longitudinal side edges disposed and retained within said recess formations in a normal position of said side walls and being separable therefrom through outward springing of said side walls, and wherein said locking means in the tightened position of said screw presses said side walls inwardly against said side edges of said contact bar and restrains outward flexing of said side walls.

13. In combination, a pair of aligned conductor bars joined in end-to-end relation, each comprising a shell of substantially inverted U-shape in cross-section including an upper end portion and side walls extending downwardly from said upper end portion with their lower edges transversely aligned, a current-conducting contact bar within said shell in spanning relation between said side walls, an insulating sheath of dielectric plastic material engaged over said shell, said sheath being of substantially inverted U-shape in cross-section and including an upper end portion and side walls extending downwardly from said upper end portion of substantially uniform thickness and of a cross-sectional shape to conform in substantially skin-tight relation to the outer surfaces of said shell, said side walls of said sheath extending downwardly below said lower edges of said shell and having lower marginal portions inclined inwardly in spaced relation below said lower edges of said shell, said sheaths terminating short of the joined ends of said shells to leave end parts of the joined ends exposed, and a joint cover of dielectric plastic material of inverted U-shape in cross-section including an upper end portion and side walls extending downwardly from said upper end portion, said cover being of a length to span said exposed parts of said joined ends with its end portions in overlapping relation to the end portions of said sheaths, and said side walls of said cover having lower marginal portions inclined inwardly with their end portions overlying the end portions of said lower marginal portions of said sheaths to restrain vertical movement of said cover.

14. The invention as defined in claim 13, further characterized in that said side walls of said joint cover have projections at their inner sides disposed intermediate the ends of said sheaths to limit relative longitudinal movement of said cover.

15. The invention as defined in claim 13, further characterized in that said sheath is inherently resilient and is sprung over said shell.

16. The invention as defined in claim 13, further characterized in that said joint cover is inherently resilient and is sprung over the end portions of said sheaths.

No references cited.

ARTHUR L. LA POINT, *Primary Examiner.*

S. T. KRAWCEWICZ, *Assistant Examiner.*